May 24, 1949. R. E. DODGE 2,471,399
BUTTER DISPENSER
Filed Dec. 19, 1947 5 Sheets-Sheet 1
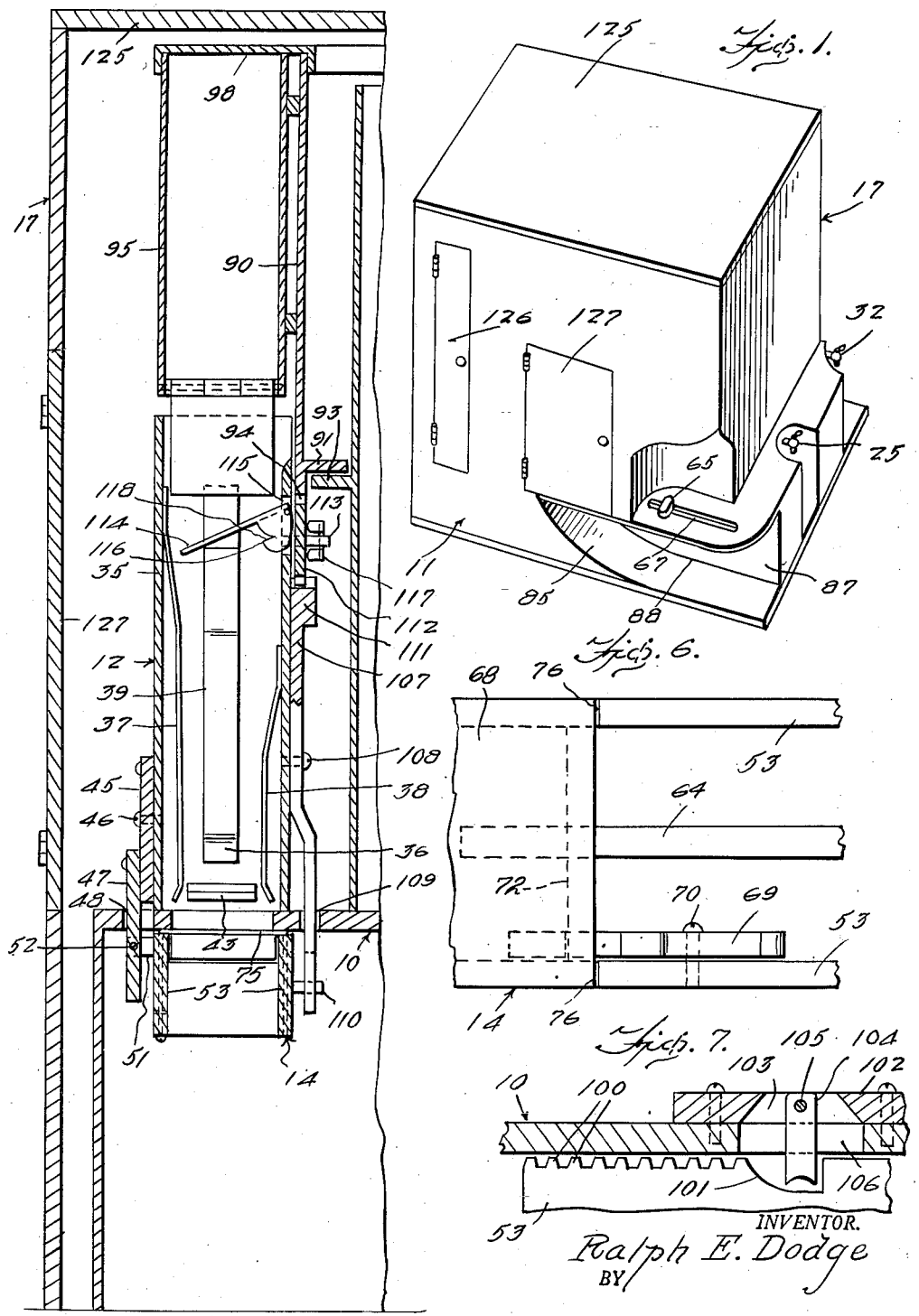
INVENTOR.
Ralph E. Dodge
BY
McMorrow, Berman & Davidson
ATTORNEYS May 24, 1949.  R. E. DODGE  2,471,399
BUTTER DISPENSER
Filed Dec. 19, 1947  5 Sheets-Sheet 2
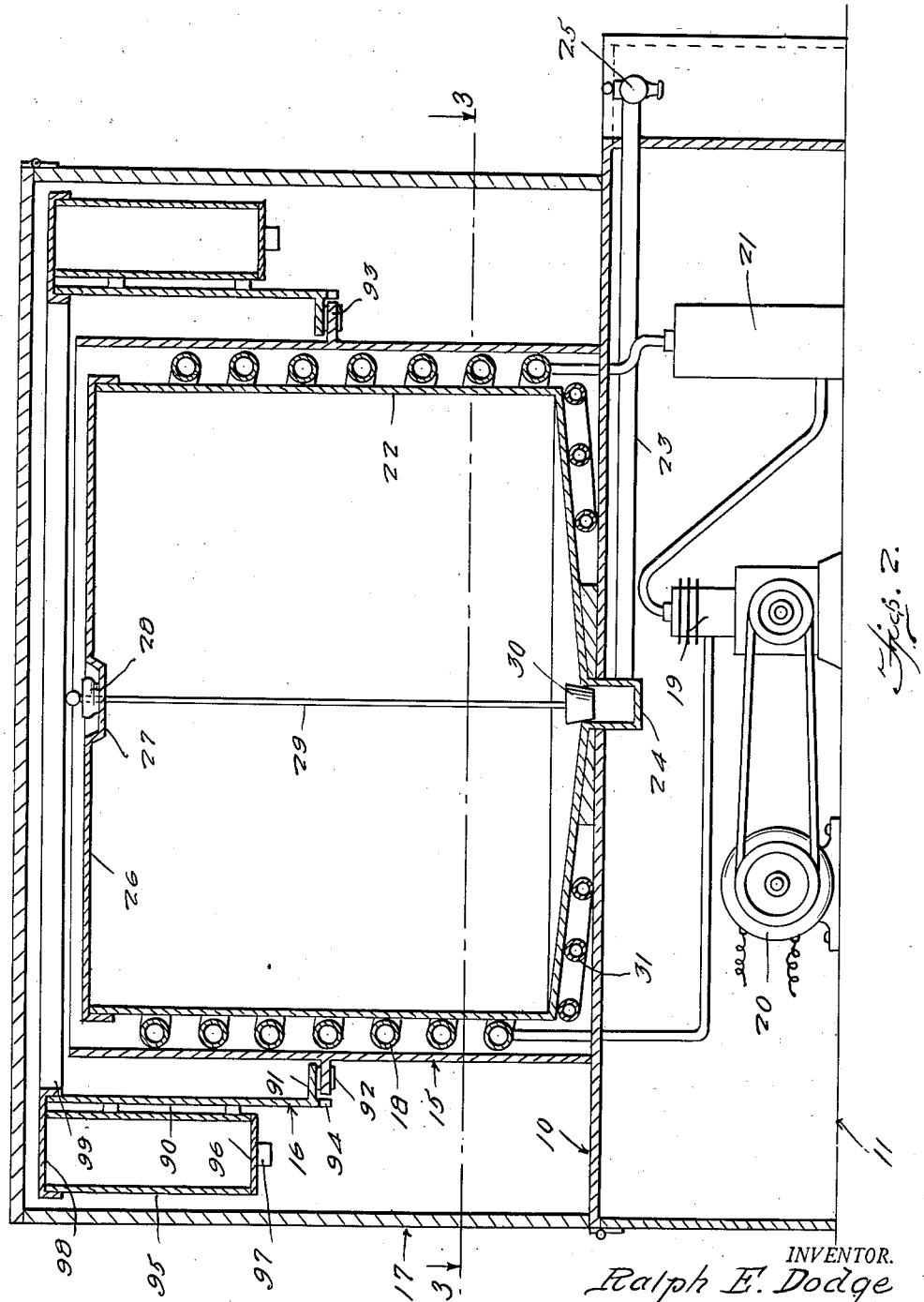
INVENTOR.
Ralph E. Dodge
BY
McMorrow, Berman & Davidson
ATTORNEYS

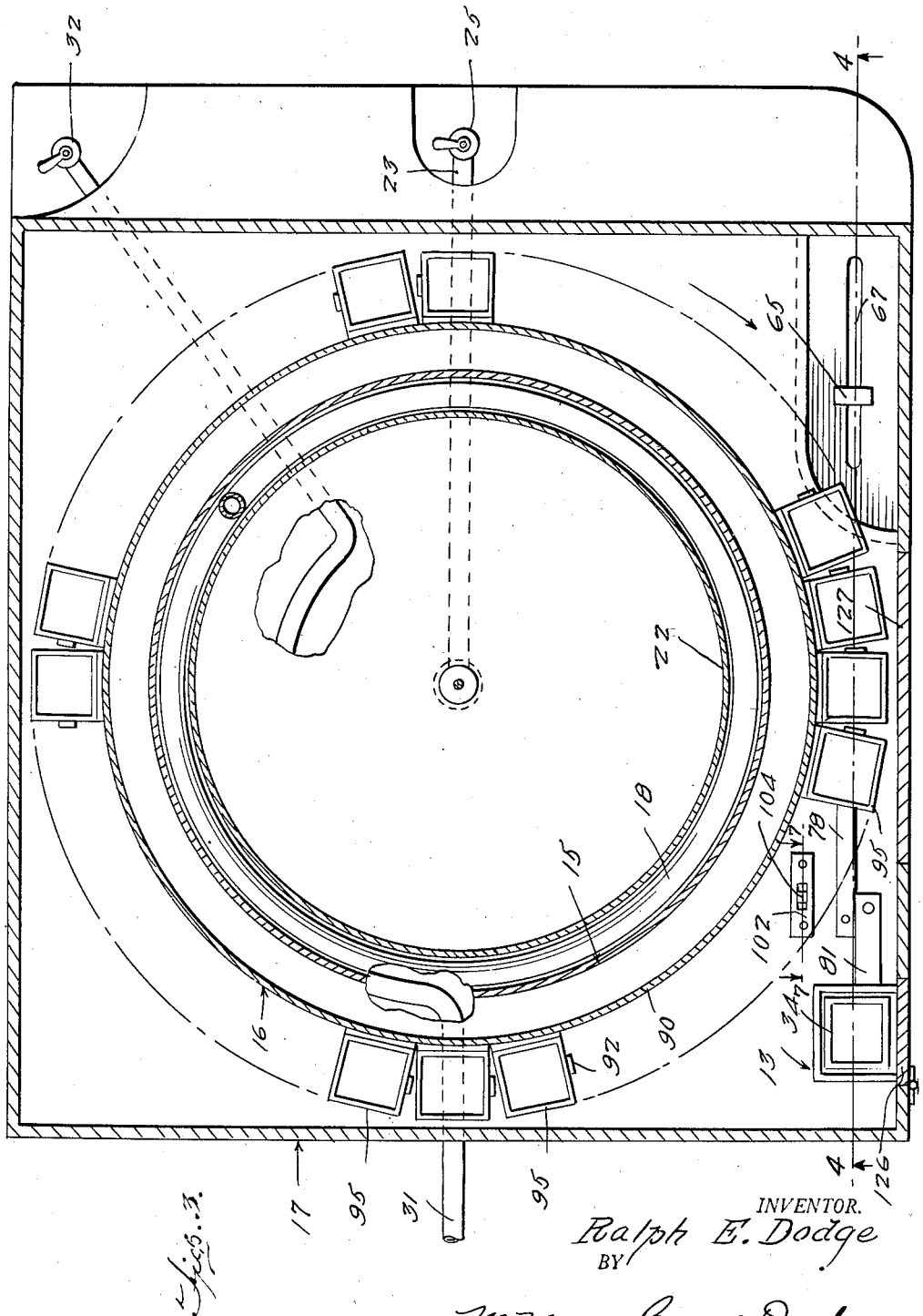

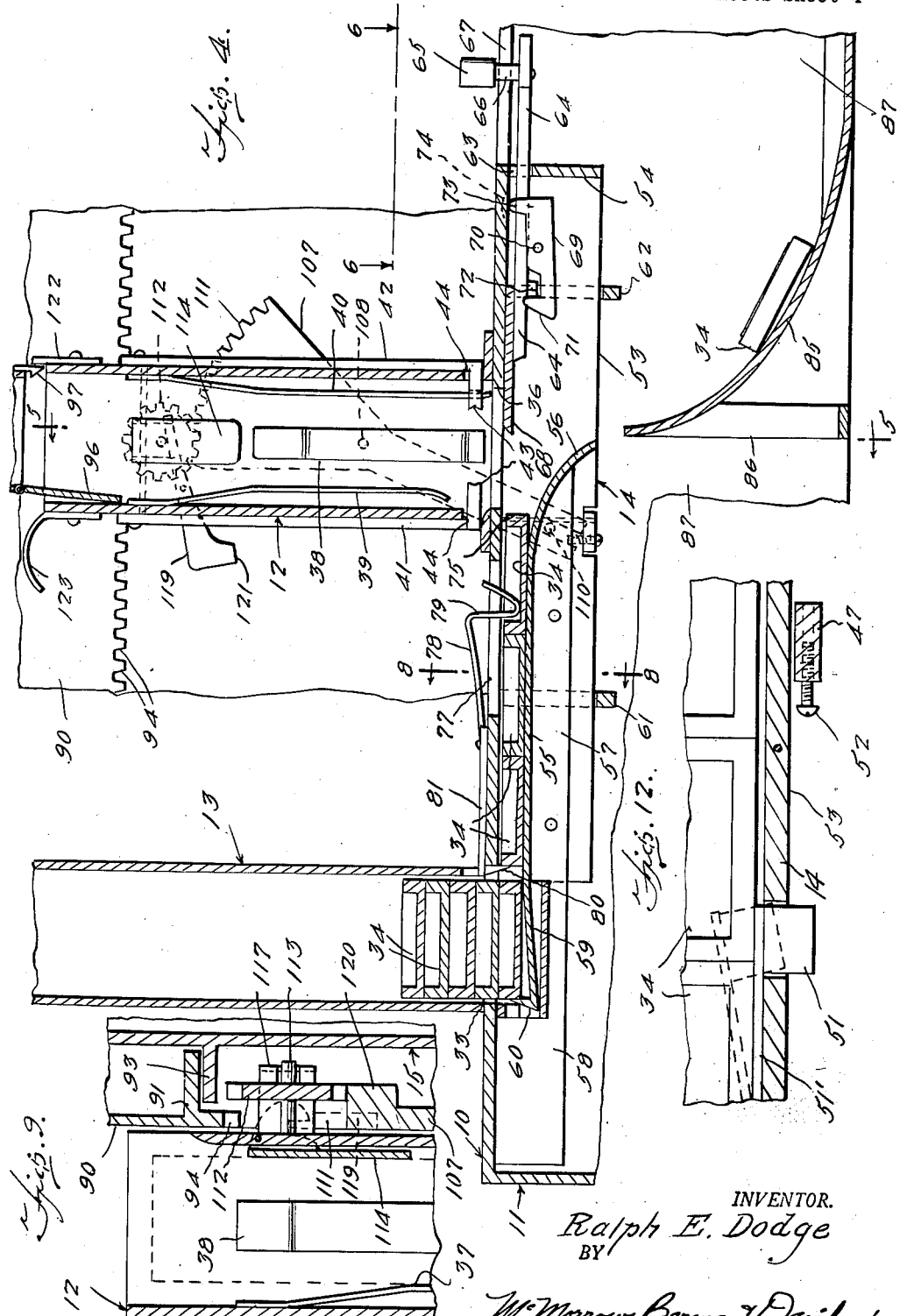

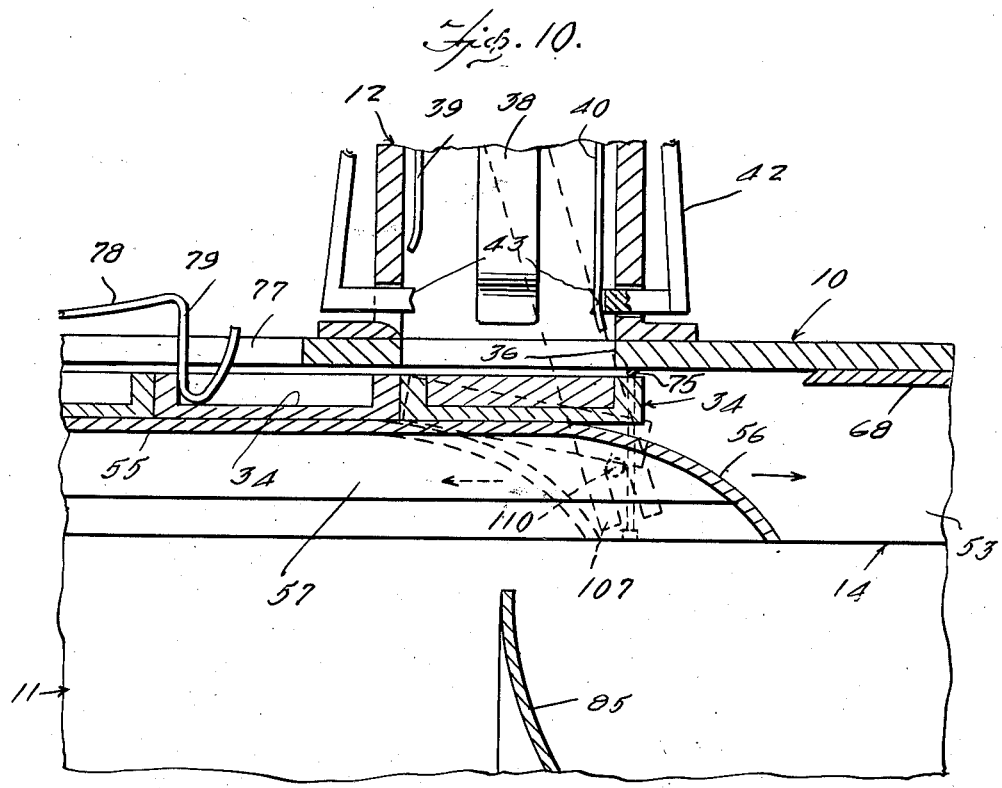
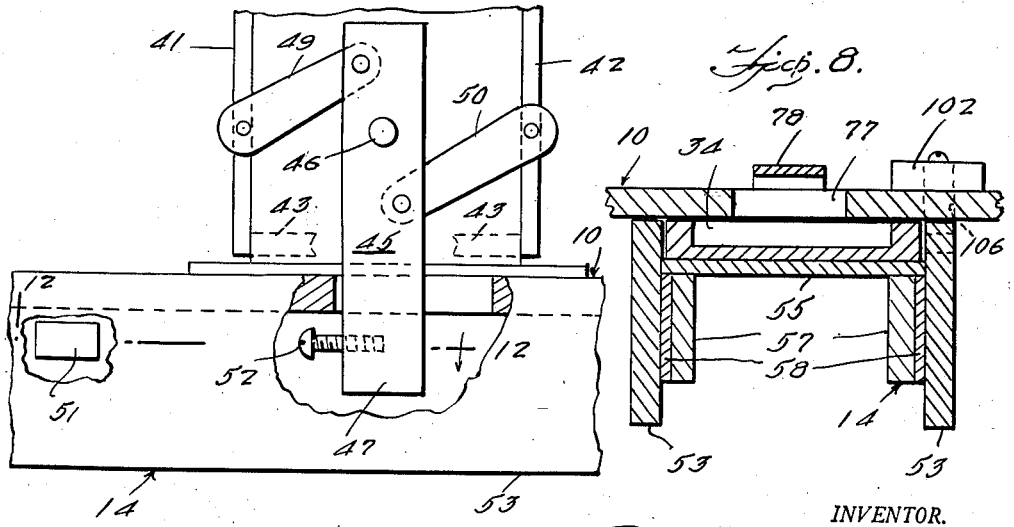

Patented May 24, 1949

2,471,399

UNITED STATES PATENT OFFICE 2,471,399

BUTTER DISPENSER

Ralph E. Dodge, Takoma Park, Md.

Application December 19, 1947, Serial No. 792,763

11 Claims. (Cl. 31—6)

This invention relates to improvements in dispensing apparatus, and more particularly to a device for dividing a severable material, such as butter, into individual servings and depositing such individual servings on respective chips or receptacles.

It is among the objects of the present invention to provide an improved dispensing device for severing individual servings of edible material from a bulk supply of such material and placing such servings in respective chips or receptacles without contact of the material with any source of possible contamination, which maintains the material, such as butter, in a clean, fresh and cool condition until the same is dispensed from the machine, which will receive at one time a large quantity of such material in bulk form sufficient, for example, for a day's supply for a restaurant, hotel, hospital or military mess, which functions automatically upon manual operation thereof to sever individual servings from a bulk supply of material, place each individual serving on a respective chip or receptacle and deliver the chip with the serving of material thereon to a location at which the chips can be easily removed, which also provides a refrigerated receptacle for other material, such as cream or milk, which is of a size to be conveniently located in a kitchen or pantry for use by food servers, or may be mounted upon a cafeteria counter for use by customers, if desired, is simple and durable in construction, economical to manufacture, easy to operate, and neat and attractive in appearance.

A further object resides in the provision of an improved dispensing device which may be conveniently set up in the kitchen or pantry of a food serving establishment so that food servers or customers may obtain individual servings of food therefrom, as required, and which device has a food magazine and a food receptacle magazine mounted in proximity to each other on a suitable support, a manually-operated slide carried by the support below both magazines for successively moving food receptacles or chips from the food receptacle magazine to a position below the food magazine and subsequently discharging them at a location from which they may be conveniently removed, severing individual servings of food from the food in said food magazine and depositing each individual serving upon a respective food receptacle while positioned below the food magazine, means for carrying a reserve supply of food adjacent the food magazine movable by operation of the slide to automatically replenish the supply of food in the food magazine, when required, and means for maintaining the food in the food magazine and in the reserve food supply under refrigeration while in the dispenser.

Other objects and advantages will become apparent from a consideration of the following description in conjunction with the accompanying drawings, wherein:

Figure 1 is a perspective view of a food dispenser illustrative of the invention;

Figure 2 is a medial vertical cross-section on an enlarged scale of the food dispenser illustrated in Figure 1;

Figure 3 is a horizontal cross-section taken substantially on the line 3—3 of Figure 2;

Figure 4 is a vertical cross-section of a fragmentary portion of the dispenser taken substantially on the line 4—4 of Figure 3, and particularly illustrating the manually-operated dispensing mechanism of the device;

Figure 5 is a vertical cross-section of a fragmentary portion of the dispenser, particularly illustrating the food-receiving magazine, taken substantially on line 5—5 of Figure 4;

Figure 6 is a top plan view of a fragmentary portion of a manually-operated dispensing slide illustrated in cross-section in Figure 4 looking downward from the line 6—6 of Figure 4;

Figure 7 is a longitudinal cross-section of a fragmentary end portion of the slide showing a structural detail including an anti-reversing latch for the slide and is taken substantially on the line 7—7 of Figure 3;

Figure 8 is a transverse cross-section of the manually-operated slide taken substantially on the line 8—8 of Figure 4;

Figure 9 is a vertical cross-section of the fragmentary upper portion of the food magazine, particularly illustrating the drive means for the device which automatically replenishes the supply of food in the food magazine;

Figure 10 is a vertical cross-section of the fragmentary lower end portion of the food magazine and associated portion of the dispenser support and slide;

Figure 11 is a side elevation of the lower end portion of the food magazine; and Figure 12 is a longitudinal cross-section of a fragmentary portion of the dispensing slide, taken substantially on the plane of section line 12—12 of Figure 11 and showing a constructional detail.

The improved dispenser comprises, in general, a substantially horizontal support in the form of a platform 10 supported at the upper edge of a base wall 11 and provided with a pair of spaced-apart openings above which are mounted respectively a substantially vertical food magazine 12 and chip or receptacle magazine 13, a manually-operated reciprocating slide 14 supported by the platform 10 immediately below the magazine openings therein, a cylindrical standard 15 mounted on the platform 10 and extending upwardly therefrom, and a carrier 16 rotatably mounted on the standard 15 and carrying a reserve supply of food for automatically replenishing the food supply in the food magazine 12.

Preferably the dispenser has an outer cover or casing 17, formed of heat-insulating material, and mounted upon the platform 10 surrounding and enclosing the carrier 16. The interior of the cylindrical carrier 15 may be utilized as an ice receptacle for refrigerating the food supply in the dispenser or, as illustrated, a refrigerating coil 18 may be mounted within the standard and operatively connected to refrigerating apparatus contained within the base wall 11, such refrigerating apparatus including a conventional compressor 19, a compressor driving electric motor 20, a condenser 21, and the usual expansion valve and automatic controls which it has not been considered necessary to illustrate in detail. A cylindrical receptacle 22 for coffee cream or other food material which it is desired to maintain under refrigeration, may be disposed within the refrigerating coil 18 and provided with an outlet conduit 23 extending from a sump 24 in the bottom of the container and having at its outer end a valve or faucet 25 through which the cream or other contents may be withdrawn from the container 22, as desired. The container 22 preferably has a cover or lid 26 provided with an apertured central depression 27 within which is mounted a knob 28. A rod 29 extends through knob 28 and the aperture in depression 27 and carries at its lower end a stopper 30 which fits into the sump 24 to close the bottom outlet of the container 22 when desired.

There is also illustrated a cooling coil 31 disposed between the platform 10 and the bottom of container 22 which coil may be used for cooling water to thereby constitute the dispenser a station unit at which a food server may obtain a butter serving, cream for coffee and chilled water to fill a water glass without having to gather these items from separate locations thereby saving time and materially improving the efficient serving of food in a food handling establishment, such as a restaurant, hotel, etc.

The cooling coil 31 is connected at one end to a water supply conduit and extends at its other end to a suitable faucet 32, illustrated in Figure 1.

The chip or receptacle magazine 13 comprises a tubular member of square or rectangular cross-sectional shape secured at its lower end to the upper surface of platform 10 over opening 33 and preferably having one open side for convenience in stacking the chips or receptacles 34 therein. The bottom receptacle of the stack rests upon the corresponding end of slide 14 for movement by the slide in a manner to be later described.

The food magazine 12 is particularly illustrated in Figures 4, 5, 10 and 11, and comprises a tube 35 of square or rectangular cross-section secured to and extending upwardly from the platform 10 surrounding the opening 36 in the platform. This tube is of a size to loosely receive a food unit such as a quarter-pound butter stick disposed lengthwise of the tube. A pair of leaf springs are secured inside of the tube with their upper ends secured to the inner surfaces of opposite tube walls, the spring 37 being secured to the outer wall of the tube and the spring 38 to the inner wall thereof. A pair of similar springs 39 and 40 are also mounted within the tube with their upper ends secured to the inner surfaces of the opposite side walls of the tube, as is particularly illustrated in Figure 4. These leaf springs act to center the butter stick in the tube and permit it to slide downwardly through the tube without sticking as individual butter servings are successively removed from the bottom end of the stick.

A pair of leaf springs 41 and 42 are secured at their upper ends to the upper portions of the tube side walls exteriorly thereof and are provided at their lower ends with dogs 43 which extend inwardly through respective apertures or slots 44 in the tube side walls near the bottom end thereof to grip the sides of a butter stick received in the magazine tube and hold the stick against downward movement during certain phases of the operation of the dispenser. A lever 45 is pivotally mounted on the outer wall of the tube near the lower end thereof by a suitable pivot pin 46 and is provided with an extension 47 which projects downwardly through a slot 48 in the platform 10 to a position alongside the slide 14. A pivoted link 49, Figure 11, connects the upper end of lever 45 with spring 41 and a similar link 50 connects the lever 45 below the pivot pin 46 with the spring 42 so that the two springs are moved outwardly at their lower ends away from the side walls of the tube when the extension 47 of the lever is moved to the right, as viewed in Figure 11, thereby retracting the dogs 43 to permit the butter stick to move downwardly in the magazine tube. This dog-retracting movement is imparted to the lever extension 47 by an abutment 51 on slide 14 which abutment contacts the opposed end of an adjustable extension 52 carried by the extension 47 near the lower end thereof.

This abutment is mounted on the free end of a leaf spring 51' secured to the slide side rail 53 and which acts to resiliently retract the abutment to the inoperative position shown in broken lines in Figure 12 when there is no receptacle in the slide. A receptacle 34 in the slide forces the abutment outwardly to the full line position in which it will contact the extension 52. Thus, the dogs 43 cannot be retracted to release the food in the food magazine unless there is a food-receiving receptacle in operative position on the slide. With this arrangement, when the slide is moved to its limiting right-hand position, as viewed in Figure 4, the lever 45 will be turned about the pivot pin 46 to retract the dogs 43 and permit the butter stick to drop into a receptacle 34 supported by the slide immediately below the opening 36 in platform 10.

The slide 14 is particularly illustrated in Figure 4, 8 and 10 and comprises a pair of substantially parallel side walls 53 secured at their forward ends to a transverse end wall 54. A transverse plate 55 is secured between the side walls or side rails 53 of the slide and extends from the rear, or left-hand ends of these rails as viewed in Figure 4, forwardly to a location substantially at the mid-length of the two parallel side rails. This plate 55 is provided at its forward end with a downwardly-curved end portion, the flat portion of the plate being disposed below the top edges of the side rails a distance substantially equal to the height of one of the chips or receptacles 34 and the curved portion 56 extending downwardly to the bottom edges of the two rails. At its opposite sides the plate 55 is supported on respective reinforcing strips 57 secured to the corresponding side rails and a pair of flexible extensions 58 extend rearwardly of the side rails from the forward ends of the reinforcing strips 57 which underlie the curved forward end 56 of the plate 55. Each flexible extension 58 is secured between the corresponding side rail and associated reinforcing strip 57 and the extensions are spaced apart a distance just sufficient to receive the receptacles 34 therebetween. The plate 57 is extended at its rearward end to provide a tongue 59 projecting rearwardly from the rear ends of the side rails 53 and the rear end of this tongue is provided with a hook 60 which is adapted to engage behind the bottom receptacle of the stack aligned with the opening 33 to move such receptacle toward the opening 36 upon forward or right-hand movement of the slide, as viewed in Figure 4.

The slide is supported for reciprocatory movement below the platform 10 by a pair of spaced-apart hangers 61 and 62 which may be conveniently formed of flat, U-shaped members each having a pair of legs disposed one at each side of the slide and a bight portion connecting the legs and underlying the slide side rails 53 with the ends of the legs opposite the bight portions secured to the under surface of platform 10.

The front end wall 54 is provided in its upper edge with a notch or recess 63 which slidably receives a tongue 64 positioned immediately below the platform 10. A hand knob 65 is secured to the forward end of tongue 64 by a shank 66 slidably received in an elongated slot 67 provided in the platform and the rearward end of the tongue is attached to the forward edge of a flat cover plate 68 of a size to cover the food magazine opening 36. Tongue 64 is releasably held in its forward or right-hand position relative to the slide by a latch 69 pivotally secured to one of the slide side rails by a pin 70 having at its rearward end a hook 71 engageable behind a transverse bar 72 secured below cover plate 68 at the forward end thereof and having at its forward end a detent 73 which normally rides upon the under surface of platform 10 to hold the hook 71 in engagement with the bar 72, but which is received in a curved recess 74 in the under surface of the plate when the slide has been moved to its limiting rearward or left-hand position to release the tongue and cover plate so that the cover plate may be independently moved to a position closing the opening 36.

A cutting wire 75, secured at its ends to the side rails 53, extends transversely of the slide at a location such that it is positioned just to the left-hand or rearward end of opening 36 when the slide has been moved to its limiting rearward or left-hand position, as illustrated in Figure 4. This wire severs an individual serving of butter from the bottom end of a butter stick held in the food magazine 12 each time the slide is moved from its forward or its right-hand, to its rearward or left-hand position.

The operation of the above-described portion of the device is substantially as follows:

Assuming that the slide is in its limiting rearward or left-hand position, as illustrated in Figure 4, and that there is a train of receptacles 34 on the plate 55, with the forward end of the front receptacles just at the rearward edge of opening 36 and the hook 60 engaging the rearward end of the bottom receptacle of the stack 34; movement of the hand knob 65 forwardly, or to the right as viewed in Figure 4, will first move the tongue 64 to withdraw the cover plate 68 from its position below opening 36. As soon as the cover plate has been withdrawn from the opening its forward edge will come into contact with a pair of shoulders 76 provided in the side rails 53, as particularly illustrated in Figure 6. Continued movement of the hand knob to the right will now move slide 14 and the entire train of receptacles to the right until the forward receptacle of the train is positioned directly below the food magazine opening 36 with the cutting wire 75 positioned at the forward or right-hand side of this opening, as viewed in Figure 4. It is to be noted that the receptacles 34 are especially shaped so that their length is directly co-ordinated with the forward movement of the slide and upon each forward movement of the slide to its limiting forward position, one receptacle will be removed from the stack in the receptacle magazine 13 and another receptacle will be positioned below the food magazine opening 36. Each receptacle has a flat bottom wall, is preferably square or rectangular in shape, and has side walls of a height such as to provide an internal space which will exactly receive a food serving of the desired volume, the cutting wire 75 passing over the upper edges of the receptacle side walls to cut the food, such as butter, off flush with these edges. An elongated slot 77 is provided in the platform 10 between the magazines 12 and 13 and adjacent the magazine 13, and a leaf spring 78, having at its forward end a downwardly-extending hook 79, frictionally engages the receptacles on the plate 55 to hold them in closely-spaced end-to-end relationship so that they will not become accidentally spaced apart and the forward receptacle thereby misaligned with the opening 36.

Assuming now that the knob 65 has been moved to its limiting forward or right-hand position to position a receptacle 34 immediately below the food magazine opening 36, movement of the slide by the hand knob is now reversed, moving the slide rearwardly or to the left, as viewed in Figure 4. The train of receptacles on the plate 55 will be held against rearward movement by a stop detent 80 mounted on the rear end of a leaf spring 81 and extending downwardly through an opening in platform 10 so that its lower end extends between the receptacle at the bottom of the stack in the magazine 13 and the next adjacent receptacle.

Just before the slide 14 reaches its limiting forward or right-hand position, but with the forward receptacle 34 in position below the food magazine opening 36, abutment 51 contacts extension 52 to swing lever 45 in a direction to withdraw dogs 43 from the butter stick held in the magazine tube 12. This permits the butter stick to drop so that its lower end is received in the receptacle, the receptacle being, at this time, firmly supported on the plate 55.

As the slide 14 is moved rearwardly or to the left, as viewed in Figure 4, wire 75 is forced through the butter stick along the upper edges of the receptacle side walls.

As rearward movement of the slide 14 is continued, the plate 55 is moved rearwardly from beneath the receptacle positioned below the opening 36. This receptacle, however, adheres to the lower end of the butter stick and does not drop until the end of the stick is completely severed. Before the butter stick is completely severed the abutment 51 moves away from adjustable extension 52 permitting the dogs 43 to re-engage the butter stick to prevent its dropping down through the tube 12 until the next succeeding dispensing operation of the slide. As soon as the wire 75 has been moved sufficiently to completely sever the butter stick, the receptacle 34 with an individual serving of butter therein drops past the curved forward end 56 of the plate 55 and onto a curved delivery track 85 supported in the base portion of the dispenser by suitable means, such as the bracket 86 and side wall 87 of an inset 88 provided in a corner of the base, as is clearly illustrated in Figure 1. Wire 75 will have reached the rearward end of opening 36 while the rearward edge of cover plate 68 is still near the forward edge of the opening. At this location detent 73 of latch 69 will enter recess 74 releasing tongue 64 so that the cover plate 68 may now be moved independently to underlie and close the opening 36. The apparatus is now in position for a subsequent dispensing operation.

Referring now to Figure 2, it will be noted that the rotatable carrier 16 comprises an inner cylindrical wall 90 provided near its lower edge with an internal annular flange 91 supported on rollers 92 journaled in an external annular rib 93 secured to the cylindrical standard 15 intermediate the height thereof. The lower edge of the wall 90 is provided with gear teeth 94 for a purpose which will presently appear.

A plurality of close-spaced tubular pockets 95 are arranged around the exterior of the upper portion of cylindrical wall 90 and secured thereto with the upper ends of the pockets substantially flush with the upper edge of the cylindrical wall. A hinged door 96 closes the lower end of each pocket 95 and is releasably retained in closed position, as illustrated in Figure 2, by a respective spring catch 97 which extends downwardly below the bottom of the pocket. An annular cover 98 covers the upper end of all of the pockets of the annular series arranged around the cylindrical wall 90 and this cover has an inner depending flange 99 which lies within the upper end of the cylindrical wall 90.

As an incomplete movement of the slide 14 in either direction would disrupt the timing between the operation of the slide and the feeding of the receptacles 34, means are provided to render the movements of the slide irreversible except at each end of the reciprocatory slide movement. Suitable means for this purpose are particularly illustrated in Figure 7, and comprise a series of teeth 100 formed on the upper edge of one of the side rails 53 of the slide, a notch 101 formed in the side rail at the inner end of the set of teeth, a block 102 mounted upon the platform 10 above the corresponding side rail 53 and having a recess 103 therein which receives the upper end of the tongue 104 pivotally secured in the slot by a pivot pin 105 and extending downwardly through an opening 106 in the platform. When the tongue 104 is at either end of the set of teeth 100, movement of the slide may be reversed, but the tongue has on its lower end oppositely-disposed detents which engage the teeth at intermediate positions of the slide so that the slide must be moved to the full extent of its movement in either direction before its movement can be reversed.

A lever 107, particularly illustrated in Figure 5, is pivotally mounted on the inner side of the tubular food magazine 12 by a pivot pin 108 which extends through the lever at substantially the mid-length location thereof and is secured at its inner end in the tube inner wall. This lever projects downwardly through an elongated slot 109 in the platform 10 and has its lower end bifurcated to receive a pin 110 which projects outwardly from the adjacent side rail 53 of slide 14. The upper end of lever 107 is arcuately curved about the axis of pin 108 as a center and is provided with gear teeth 111 which mesh with the teeth of an idler gear 112 journaled on an axle pin 113 which is slidably mounted in an aperture in the inner wall of the food magazine tube. This idler gear 112 meshes with the gear teeth 94 on the lower edge of the cylindrical wall 90 of carrier 16 so that the carrier is rotatable by swinging movement of the lever 107 under actuation of the slide 14.

Lever 114 is pivotally mounted at one end to the inner side of the food magazine tube within an opening 115 somewhat above the axle pins 113 and carries a pair of cams 116 which bear against the adjacent side of gear 112, so that when the lever is forced downwardly and held down by the presence of a butter stick in the magazine, the idler gear is forced outwardly and out of mesh with the teeth 94 of the cylindrical wall 90. The gear is resiliently urged into mesh with the teeth 94 by a leaf spring 117, one end of which is apertured to receive the corresponding end of axle pin 113. The cams are provided with aligned shoulders 118 and a weighted latch member 119 pivotally mounted on the inner wall of the food magazine tube engages these shoulders to releasably lock the gear 112 in its outer position in which it is out of mesh with the gear teeth 94.

The operation of this last-described portion of the mechanism is substantially as follows:

As long as there is a sufficient supply of butter in the food magazine 12, to maintain the lever 114 depressed, the idler gear 112 remains out of mesh with the gear teeth 94 so that the rotatable carrier 16 is not moved. This out-of-mesh position of the idler gear 112 is particularly illustrated in Figure 9 wherein it is shown that the rack end 120 of lever 107 has sufficient thickness that the gear 112 remains in mesh with the gear teeth 111 of the lever regardless of whether it is in mesh with the gear teeth 94 of the cylindrical wall 90.

If now the supply of butter in the magazine 12 is diminished to an extent such that the lever 114 is permitted to rise, idler gear 112 will move into mesh with the gear teeth 94 on the lower edge of wall 90 as soon as the slide 14 is moved to its limiting forward or right-hand position, since, in that position of the slide the upper end of lever 107 strikes a depending detent 121 on the outer end of latch 119 and moves the latch to free the idler gear 112 for inward movement into mesh with the gear teeth 94. Upon the subsequent rearward or left-hand movement of the slide, lever 107 is swung about its pivotal connection 108 rotating the carrier 16 to move an empty pocket 95 away from the upper end of magazine 12 and a subsequent loaded pocket into registry with the upper end of the magazine. As the loaded pocket reaches its position over the upper end of the magazine 12 a tongue 122 projecting upwardly from the forward side of the magazine strikes the depending tongue 97 of the pocket door latch and releases the door 96 which immediately swings downwardly into the upper end of the magazine, as is clearly illustrated in Figure 4. The butter stick then falls from the pocket into the magazine depressing the lever 114 and moving idler gear 112 out of mesh with gear teeth 94. The carrier 16 will then remain immovable until this butter stick is exhausted from the magazine sufficiently to allow the lever 114 to rise, at which time the above operation is repeated to automatically re-load the magazine. As the emptied pocket moves away from the magazine a curved bracket 123 contacts the underside of the door 96 and forces the door upwardly until it closes the bottom of the pocket and is re-engaged by latch 97. This conditions the empty pocket for re-loading, when desired.

When it is desired to re-load the carrier pockets, the top cover 125 of the outer casing 17 is opened or removed, the pocket cover 98 is subsequently removed to uncover the upper ends of the pockets 95, and a butter stick is then placed in each empty pocket until the machine is re-loaded to the desired extent.

As is particularly illustrated in Figure 1, the curved track 85 extends downwardly to the front bottom corner of the device where it is flattened to provide a rest constituting a convenient location for the removal of loaded butter receptacles from the machine. The outer covering is provided with a door 126 which may be opened to give access to the receptacle magazine 13 so that a supply of receptacles can be stacked in this magazine and with a second door 127 which may be opened to give access to the food magazine 12 so that this portion of the device may be cleaned and sterilized, when desired, and any misplaced particles of food removed therefrom.

As is clearly apparent from Figure 1, the device provides a neat and attractive appearance and is easy and convenient to operate and, as may be determined from the remaining figures and the above description, it is fully automatic in operation upon manual actuation of the hand knob for both dispensing individual servings of food, such as butter, from the food magazine, and for automatically refilling the magazine when required. The device is also of simple and economical construction and not subject to operating difficulties and dispenses individual food servings of uniform quantity at all times.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A dispensing device comprising a platform, a food magazine and a food receptacle magazine mounted on said platform in proximity to each other, said food magazine being adapted to contain a body of food movable downwardly therein and said receptacle magazine being adapted to contain a stack of food-receiving receptacles, and a manually-operated slide supported on said platform below both of said magazines for reciprocation in a direction extending from one of said magazines to the other, said slide comprising a pair of substantially parallel side rails, a transverse plate between the rearward portions of said side rails having a downwardly-curved front end and providing thereabove a guideway for food receptacles, a hook secured to the rear end of said plate for moving receptacles from the bottom of a stack of such receptacles in said receptacle magazine onto said guideway, a food cutting wire extending transversely between said side rails ahead of said plate, and a hand knob operatively connected to said side rails and accessible at the top of said platform.

2. A dispensing device comprising a platform, a food magazine and a food receptacle magazine mounted on said platform in proximity to each other, said food magazine being adapted to contain a body of food movable downwardly therein and said receptacle magazine being adapted to contain a stack of receptacles, and a manually-operated slide supported on said platform below both of said magazines for reciprocation in a direction extending from one of said magazines to the other, said magazines being disposed above and said slide below said platform and said platform having a respective opening therein at the lower end of each magazine, said slide comprising a guideway for guiding receptacles from said receptacle magazine to said food magazine and for discharging said receptacles from said slide, means at the rear end of said guideway for moving a receptacle from said receptacle magazine onto said guideway upon each reciprocation of said slide, and means for severing an individual serving of food from the lower end of the body of food in said food magazine upon each reciprocation of said slide and while a food-receiving receptacle is positioned below the lower end of said food magazine.

3. A dispensing device comprising a platform having openings therein, a food magazine and a food receptacle magazine mounted on said platform above respective openings and in proximity to each other, said food magazine being adapted to contain a body of food movable downwardly therein and said receptacle magazine being adapted to contain a stack of receptacles, a manually-operated slide supported on said platform below both of said openings for reciprocation in a direction extending from one of said magazines to the other, said slide comprising a guideway for guiding receptacles from said receptacle magazine to said food magazine and for discharging said receptacles from said slide, means at the rear end of said guideway for moving a receptacle from said receptacle magazine onto said guideway upon each reciprocation of said slide, and means for severing an individual serving of food from the lower end of the body of food in said food magazine upon each reciprocation of said slide, a resiliently supported detent extending through an opening in said platform adjacent the forward side of said receptacle magazine and engaging the rearmost receptacle on said guideway to hold the receptacles on said guideway against reverse movement, and a spring tongue extending through an opening in said platform between said magazines and engaging the receptacles on said guideway to maintain such receptacles in end-to-end relationship.

4. A food dispensing device comprising a platform having openings therein, a food magazine and a food receptacle magazine mounted on said platform above respective openings and in proximity to each other, said food magazine being adapted to contain a body of food movable downwardly therein and said receptacle magazine being adapted to contain a stack of individual food serving receptacles, a manually-operated slide supported on said platform below both of said magazines for reciprocation in a direction extending from one of said magazines to the other, said slide comprising a pair of substantially parallel side rails, a plate between the rearward portions of said side rails constituting a guideway for guiding receptacles from said receptacle magazine to said food magazine and discharging them from said slide, an extension on the rear end of said plate, a hook on the rear end of said extension for moving a receptacle from said receptacle magazine onto said guideway upon each reciprocation of said slide, a hand knob for reciprocating said slide, means extending through a corresponding opening in said platform connecting said hand knob to said side rails, and means carried by said side rails operative to sever an individual serving of food from the bottom of the body of food in said food magazine upon each reciprocation of said slide and when a food-receiving receptacle is supported by said guideway immediately below said food magazine.

5. A food dispenser comprising a platform, a food magazine and a food receptacle magazine mounted on said platform in proximity to each other, said food magazine being adapted to hold a body of food movable downwardly therein and said food receptacle magazine being adapted to hold a stack of individual food-serving receptacles, a slide supported by said platform for reciprocatory movement below both of said magazines and in a direction extending from one of said magazines to the other, said slide comprising a pair of substantially parallel side rails, a plate between the rearward portions of said side rails and secured thereto to constitute a guideway for carrying receptacles from said receptacle magazine past said food magazine and for discharging said receptacles from said slide, means extending rearwardly from the rear end of said plate operative to engage the bottom receptacle of said stack and move it onto said guideway upon reciprocation of said slide, means carried by said side rails operative to sever an individual serving of food from the lower end of the body of food in said food magazine upon each reciprocation of said slide, a tongue slidably mounted between said side rails, a hand knob secured to the forward end of said tongue, a cover plate carried by the rearward end of said tongue and adapted to cover the lower end of said food magazine in one operative position of said tongue, and a latch operatively engageable between said side rails and said tongue operative to releasably hold said tongue in a forward position relative to said side rails until said slide reaches a predetermined position in its rearward movement, at which position an individual food serving has been completely severed from said food body, and to then release said tongue for rearward movement of said cover plate relative to said side rails to cover the lower end of the body of food in said food magazine.

6. A food dispenser comprising a platform, a food magazine, a food receptacle magazine, and a cylindrical standard mounted on said platform in proximity to each other, said food magazine being adapted to hold a body of food for downward movement therein and said receptacle magazine being adapted to hold a stack of individual food-serving receptacles, a slide supported by said platform for reciprocatory movement below both of said magazines in a direction extending from one of said magazines to the other, and a carrier for a reserve supply of food rotatably supported on said cylindrical standard adjacent to said food magazine, said slide comprising a guideway for guiding receptacles from said receptacle magazine to said food magazine and for discharging said receptacles from said slide, means at the rear end of said guideway for moving a receptacle from said receptacle magazine onto said guideway upon each reciprocation of said slide, and means for severing an individual serving of food from the lower end of the body of food in said food magazine upon each reciprocation of said slide, and said carrier comprising a cylindrical wall rotatably mounted upon said cylindrical standard and having gear teeth in the lower edge thereof, a series of annularly-arranged pockets secured around the outside of said cylindrical wall, each adapted to receive a body of food, a hinged door at the bottom end of each pocket, and latch means for said doors operative to release said doors upon registry of the corresponding pockets with the upper end of said food magazine for deposit of the body of food carried in said pockets into said food magazine, and means drivingly connecting said slide with said carrier.

7. A food dispenser comprising a platform, a food magazine, a food receptacle magazine, and a cylindrical standard mounted on said platform in proximity to each other, said food magazine being adapted to hold a body of food for downward movement therein and said receptacle magazine being adapted to hold a stack of individual food-serving receptacles, a slide supported by said platform for reciprocatory movement below both of said magazines in a direction extending from one of said magazines to the other, and a carrier for a reserve supply of food rotatably supported on said cylindrical standard adjacent to said food magazine, said slide comprising a guideway for guiding receptacles from said receptacle magazine to said food magazine and for discharging said receptacles from said slide, means at the rear end of said guideway for moving a receptacle from said receptacle magazine onto said guideway upon each reciprocation of said slide, and means for severing an individual serving of food from the lower end of the body of food in said food magazine upon each reciprocation of said slide, and said carrier comprising a cylindrical wall rotatably mounted upon said cylindrical standard and having gear teeth in the lower edge thereof, a series of annularly-arranged pockets secured around the outside of said cylindrical wall, each adapted to receive a body of food, a hinged door at the bottom end of each pocket, and latch means for said doors operative to release said doors upon registry of the corresponding pockets with the upper end of said food magazine for deposit of the body of food carried in said pockets into said food magazine, means drivingly connecting said slide with said carrier, and said means drivingly connecting said slide with said carrier comprising a lever pivotally supported from said platform having an arcuate upper end provided with gear teeth, means connecting the lower end of said lever with said slide for partial rotation of said lever upon each reciprocation of said slide, an idler gear operatively disposed between the gear teeth on said lever and the gear teeth on said cylindrical carrier wall, and means carried by said food magazine operative to maintain said idler gear out of mesh with one set of associated gear teeth as long as there is an adequate supply of food in said food magazine.

8. In a dispensing device, a substantially horizontal platform having two spaced-apart openings therein, an elongated manually-operated slide carried by said platform below said openings for reciprocation relative to said platform, a food magazine carried by said platform above one of said openings, and adapted to hold a body of food for downward movement therein, a stack of flat receptacles carried by said platform and extending above the other of said openings, a guideway on said slide receiving a train of receptacles in end-to-end relationship, means on said slide operative to move a receptacle from the bottom of said stack onto said guideway upon each reciprocation of said slide and to thereby move another receptacle past said food magazine opening and to discharge the same from said guideway, and means carried by said slide operative to sever an individual serving of food from the body of food in said food magazine upon each reciprocation of said slide.

9. In a dispensing device, a substantially horizontal platform having two spaced-apart openings therein, an elongated slide carried by said platform below said openings for reciprocation relative to said platform, a food magazine carried by said platform above one of said openings, a stack of flat food-receiving receptacles carried by said platform and extending above the other of said openings, a guideway on said slide receiving a train of receptacles in end-to-end relationship, means on said slide operative to move a receptacle onto said guideway upon each reciprocation of said slide and to thereby move another receptacle past said food magazine opening and to discharge the same from said slide, means carried by said food magazine and operated by said slide to deposit the lower end of the food in said food magazine into each food-receiving receptacle brought under said food magazine opening in said platform, and means carried by said slide operative to sever an individual serving from the lower end of the food in said food magazine for discharge of said food serving with the receptacle in which it is deposited.

10. In a dispensing device, a substantially horizontal platform having two spaced-apart openings therein, an elongated slide carried by said platform below said openings for reciprocation relative to said platform, a food magazine carried by said platform above one of said openings, a stack of flat food-receiving receptacles carried by said platform and extending above the other of said openings, a guideway on said slide receiving a train of receptacles in end-to-end relationship, means on said slide operative to move a receptacle onto said guideway upon each reciprocation of said slide and to thereby move another receptacle past said food magazine opening and to discharge the same from said slide, means carried by said food magazine and operated by said slide to deposit the lower end of the food in said food magazine into each food-receiving receptacle brought under said food magazine opening in said platform, means carried by said slide operative to sever an individual serving from the lower end of the food in said food magazine for discharge of said food serving with the receptacle in which it is deposited, and means carried by said support and operated by said slide to automatically replenish the supply of food in said food magazine when required.

11. In a dispensing device, a platform, a magazine for holding food mounted on said platform, a manually-operated slide supported on said platform below said food magazine for reciprocation relative to said platform, means on said slide for severing an individual food serving from the lower end of the body of food in said magazine, a standard on said platform, a carrier rotatably mounted on said standard and having a plurality of annularly-arranged food-carrying pockets thereon registrable with the upper end of said magazine to deposit food therein, and means drivingly connecting said slide and said carrier to actuate said carrier by movement of said slide to replenish the food supply in said magazine when required.

RALPH E. DODGE.

REFERENCES CITED

The following references are of record in the file of this patent:

UNITED STATES PATENTS

| Number | Name | Date |
| --- | --- | --- |
| 1,359,206 | Tripolitis | Nov. 16, 1920 |
| 1,580,498 | Knox et al. | Apr. 13, 1926 |
| 1,679,583 | Ninnis | Aug. 7, 1928 |